US012593182B2

(12) United States Patent
Haggai et al.

(10) Patent No.: US 12,593,182 B2
(45) Date of Patent: Mar. 31, 2026

(54) COMMUNICATION DEVICE AND HEARING AID SYSTEM

(71) Applicant: Intel Corporation, Santa Clara, CA (US)

(72) Inventors: Oren Haggai, Kefar Sava (IL); Arnaud Pierres, Menlo Park, CA (US); Ofir Degani, Haifa (IL); David Birnbaum, Modiin (IL); Amy Chen, San Jose, CA (US); Revital Almagor, Moshav Beit Oved (IL); Darryl Adams, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 873 days.

(21) Appl. No.: 17/560,319

(22) Filed: Dec. 23, 2021

(65) Prior Publication Data

US 2023/0209284 A1     Jun. 29, 2023

(51) Int. Cl.
H04R 25/00     (2006.01)
G06F 3/16     (2006.01)
H04R 1/08     (2006.01)

(52) U.S. Cl.
CPC ........... H04R 25/554 (2013.01); G06F 3/165 (2013.01); H04R 1/08 (2013.01); H04R 25/505 (2013.01)

(58) Field of Classification Search
CPC ...... H04R 25/554; H04R 1/08; H04R 25/505; H04R 3/04; H04R 5/04; H04R 2205/041; H04R 25/50; H04R 2225/43; G06F 3/165; H04W 4/80
See application file for complete search history.

(56) References Cited

U.S. PATENT DOCUMENTS

| 5,721,783 A | 2/1998 | Anderson |
| 2017/0048619 A1 | 2/2017 | Bang et al. |

FOREIGN PATENT DOCUMENTS

| CN | 107911528 A | 4/2018 |
| EP | 2690890 A1 | 1/2014 |
| WO | 2020019020 A1 | 1/2020 |
| WO | 2020261296 A2 | 12/2020 |

OTHER PUBLICATIONS

Extended Search Report (eESR) for corresponding European patent application No. EP22201052A, dated May 3, 2023, 9 pages (for informational purposes only).
European office action issued for the corresponding European patent application No. 22201052.2, dated Feb. 12, 2025, 10 pages (for informational purposes only).

*Primary Examiner* — Tuan D Nguyen
(74) *Attorney, Agent, or Firm* — Viering, Jentschura & Partner mbB

(57) ABSTRACT

A communication device is provided. The communication device may include a wireless communication terminal and/or terminal interface, at least one processor configured to receive a signal representing an audio signal from the wireless communication terminal and/or terminal interface, and a storage element coupled to the processor having a personal audibility feature (PAF) file stored therein, the PAF file including a personal audibility feature of a predetermined user, wherein the processor is further configured to modify the signal according to the PAF file and to provide another signal representing an audio stream based on the modified signal to the wireless communication terminal.

24 Claims, 11 Drawing Sheets

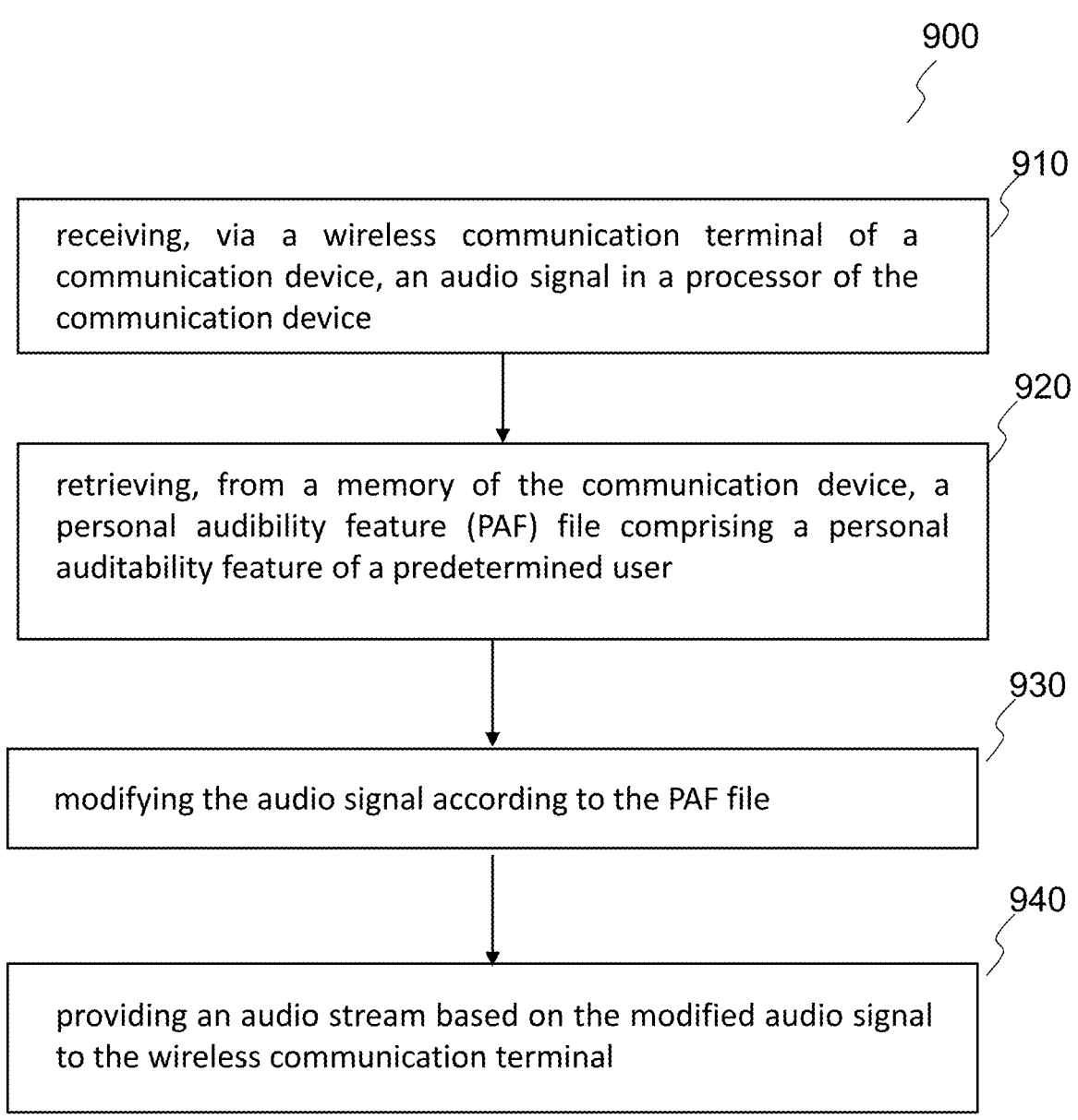

900

910 receiving, via a wireless communication terminal of a communication device, an audio signal in a processor of the communication device

920 retrieving, from a memory of the communication device, a personal audibility feature (PAF) file comprising a personal auditability feature of a predetermined user

930 modifying the audio signal according to the PAF file

940 providing an audio stream based on the modified audio signal to the wireless communication terminal

FIG. 9

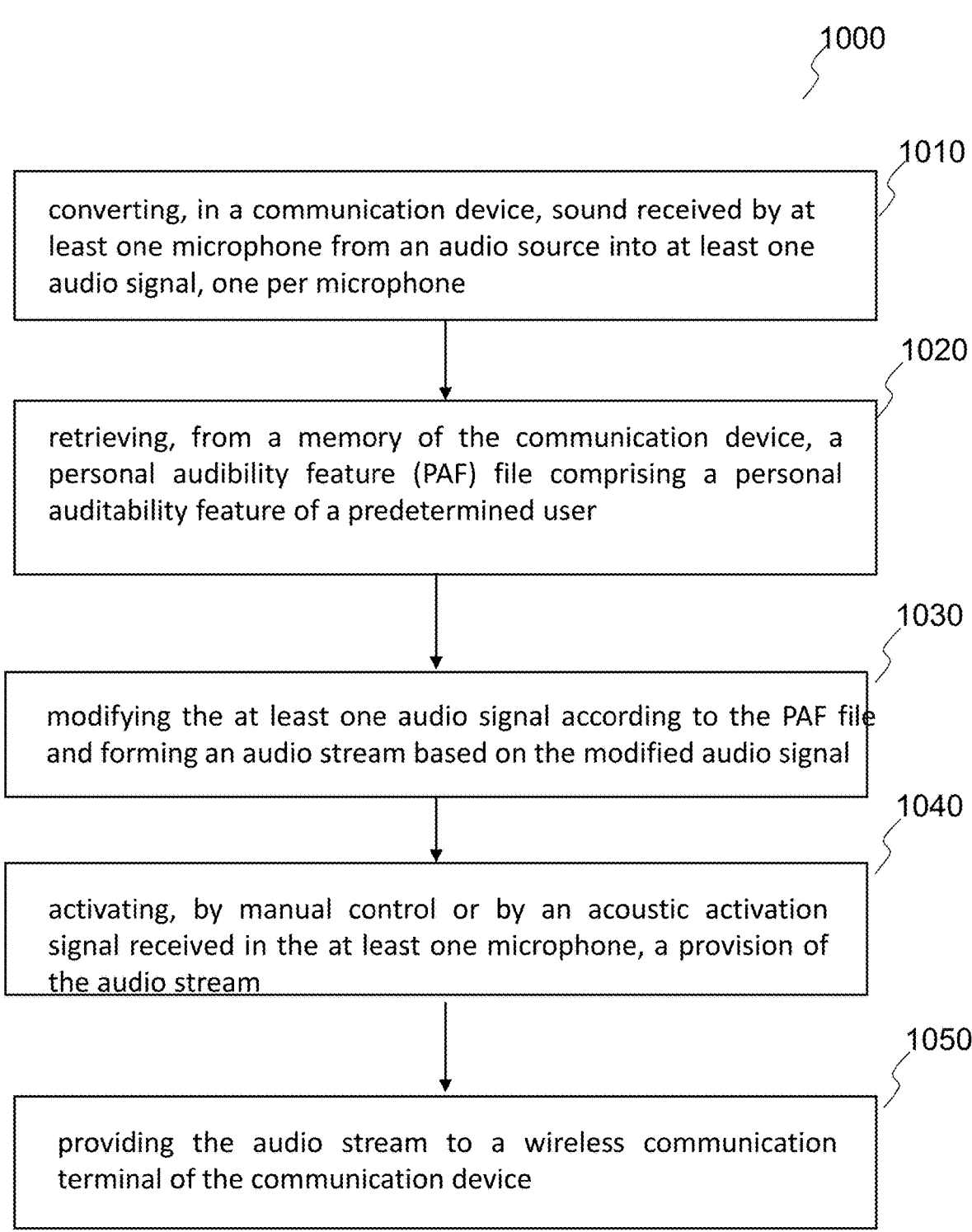

1000

1010 converting, in a communication device, sound received by at least one microphone from an audio source into at least one audio signal, one per microphone

1020 retrieving, from a memory of the communication device, a personal audibility feature (PAF) file comprising a personal auditability feature of a predetermined user

1030 modifying the at least one audio signal according to the PAF file and forming an audio stream based on the modified audio signal

1040 activating, by manual control or by an acoustic activation signal received in the at least one microphone, a provision of the audio stream

1050 providing the audio stream to a wireless communication terminal of the communication device

FIG. 10

COMMUNICATION DEVICE AND HEARING AID SYSTEM

TECHNICAL FIELD

This disclosure generally relates to hearing aid systems.

BACKGROUND

According to the World Health Organization (WHO) one in five people in the world today experience some level of hearing loss (slight to profound). Nearly 80% of people with hearing loss live in low to middle income countries. Hearing aids with Bluetooth capabilities are gaining popularity. These devices connect seamlessly to phones and other Bluetooth (BT)-enabled Internet of Things (IoT)/Wearable devices.

Hearing aids supporting the new Bluetooth Low Energy (BT LE) protocol will soon be able to connect directly to personal computers (PC). BT-capable hearing aids of the related art are expensive and could be outside of affordability for many of the global population experiencing degrees of hearing loss. People with hearing impairments may experience difficulties and/or disadvantages when engaging in online communication and other audio-based tasks. These communication barriers have been recently amplified due to remote online learning and work model adopted in response to Covid-19 pandemic.

In BT-enabled hearing aids of the related art, all audio processing and adaptation to personal audibility curves are carried out in the hearing aids. Further related art uses artificial intelligence (AI) mechanisms to improve speech recognition. In further related art, a personal computer (PC) transmits raw audio streams to headphones.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

Each of FIG. 6A

Each of FIG. 9 and FIG. 10 shows a flow diagram of a method of modifying an audio signal.

DESCRIPTION

The following detailed description refers to the accompanying drawings that show, by way of illustration, specific details and examples in which the disclosure may be practiced. One or more examples are described in sufficient detail to enable those skilled in the art to practice the disclosure. Other examples may be utilized and structural, logical, and electrical changes may be made without departing from the scope of the disclosure. The various examples described herein are not necessarily mutually exclusive, as some examples can be combined with one or more other examples to form new examples. Various examples are described in connection with methods and various examples are described in connection with devices. However, it may be understood that examples described in connection with methods may similarly apply to the devices, and vice versa. Throughout the drawings, it should be noted that like reference numbers are used to depict the same or similar elements, features, and structures.

Figure 1:
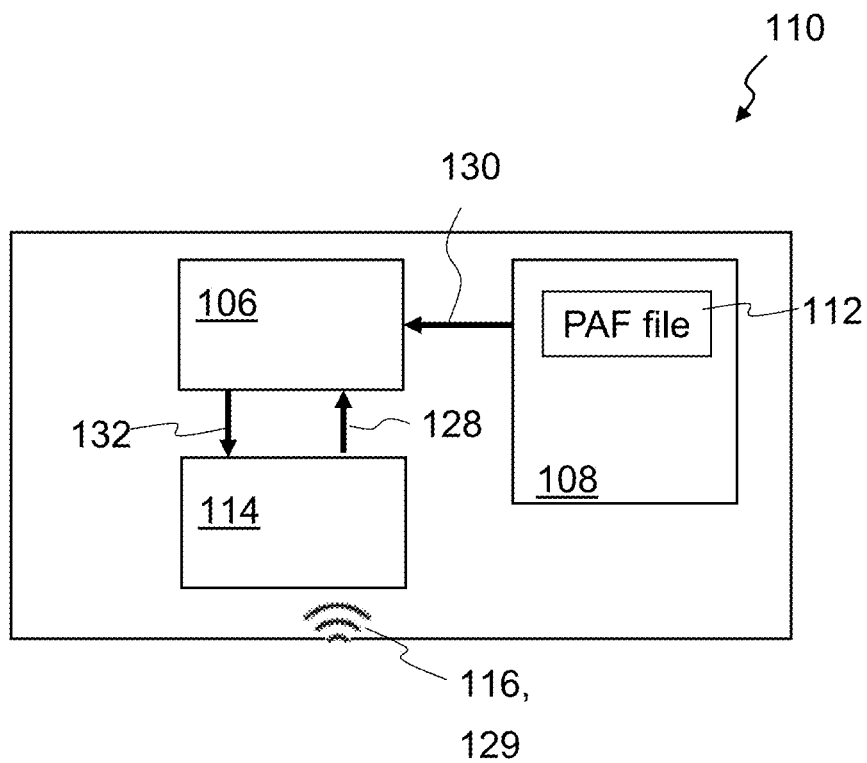
FIG. 1 illustrates an exemplary schematic diagram of a communication device.
Figure 2:
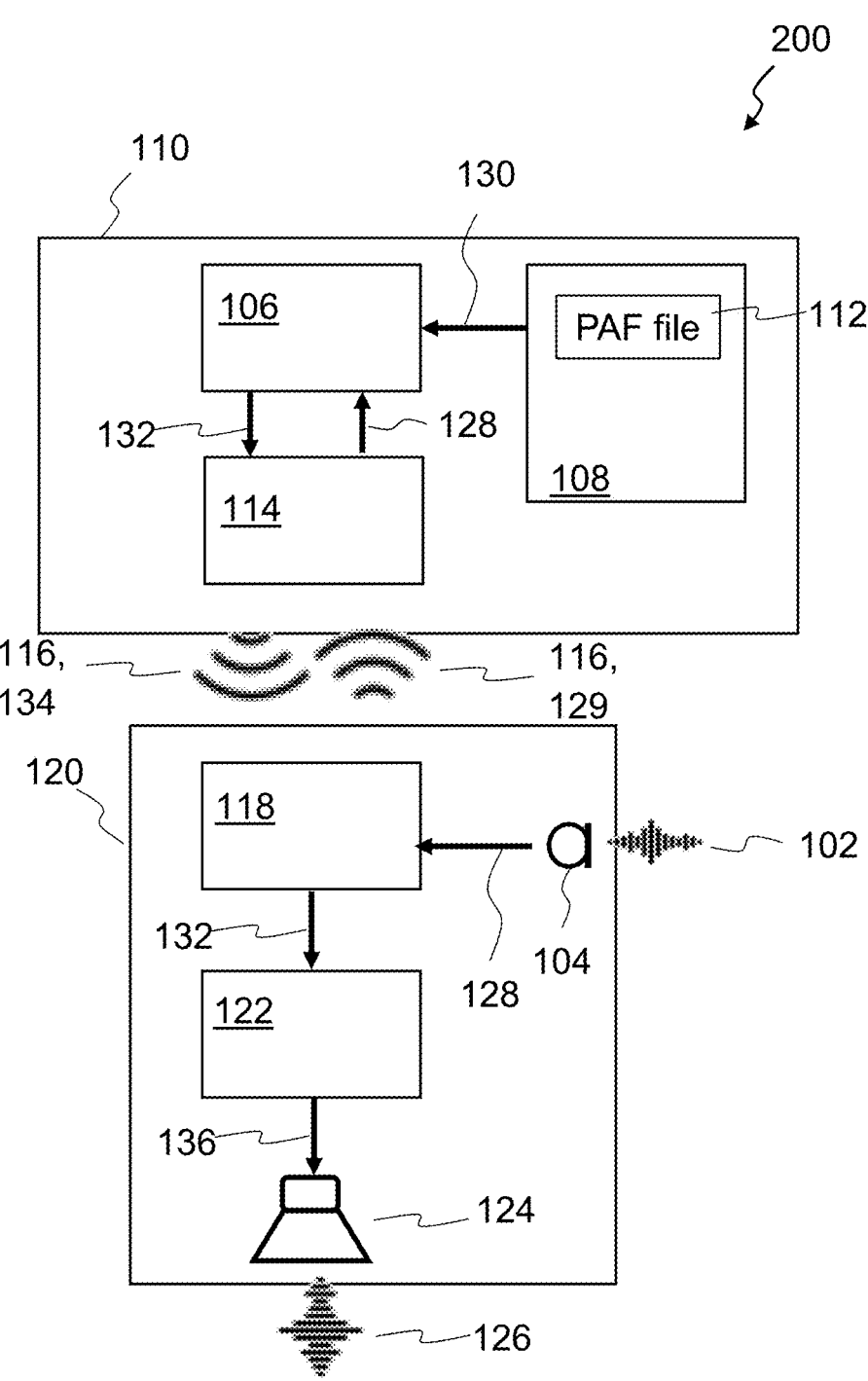
FIG. 2 illustrates an exemplary schematic diagram of a hearing aid system.
Figure 3:
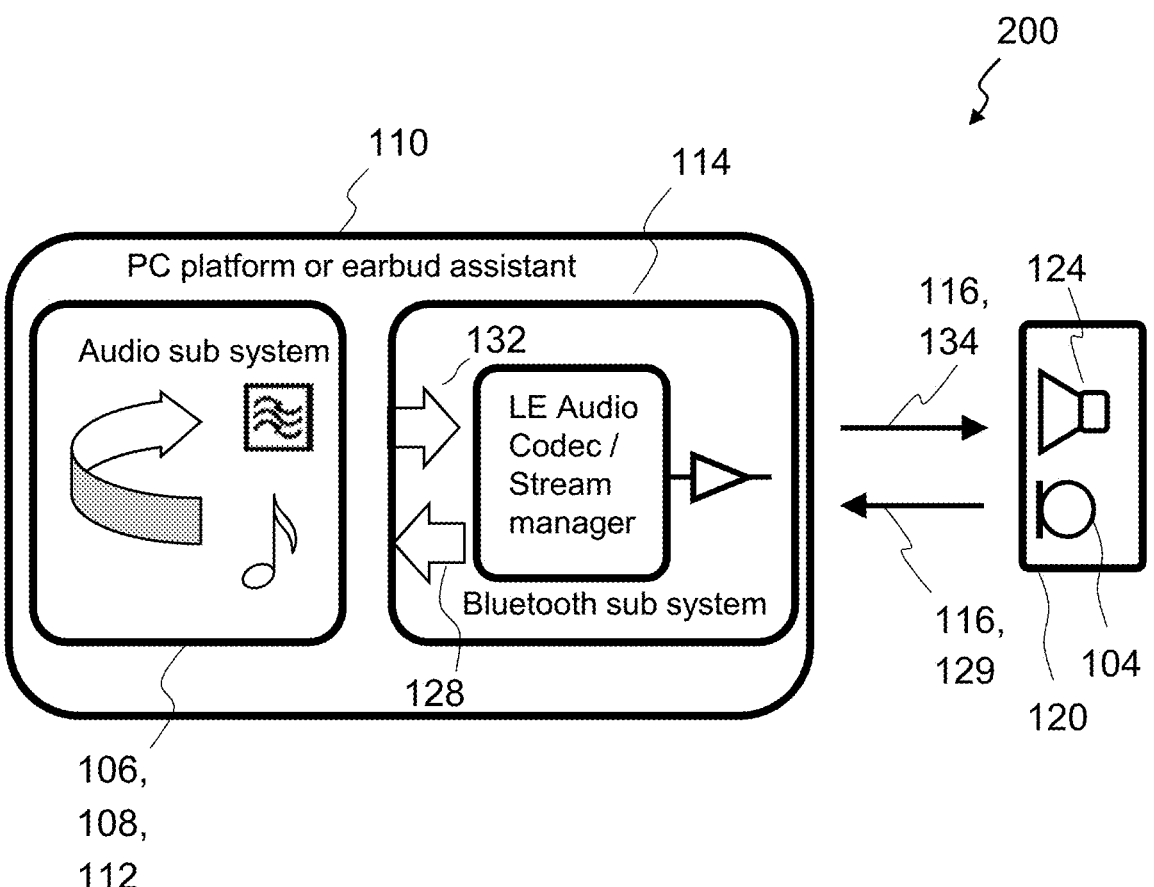
FIG. 3 illustrates an exemplary schematic diagram of a hearing aid system.
Figure 5:
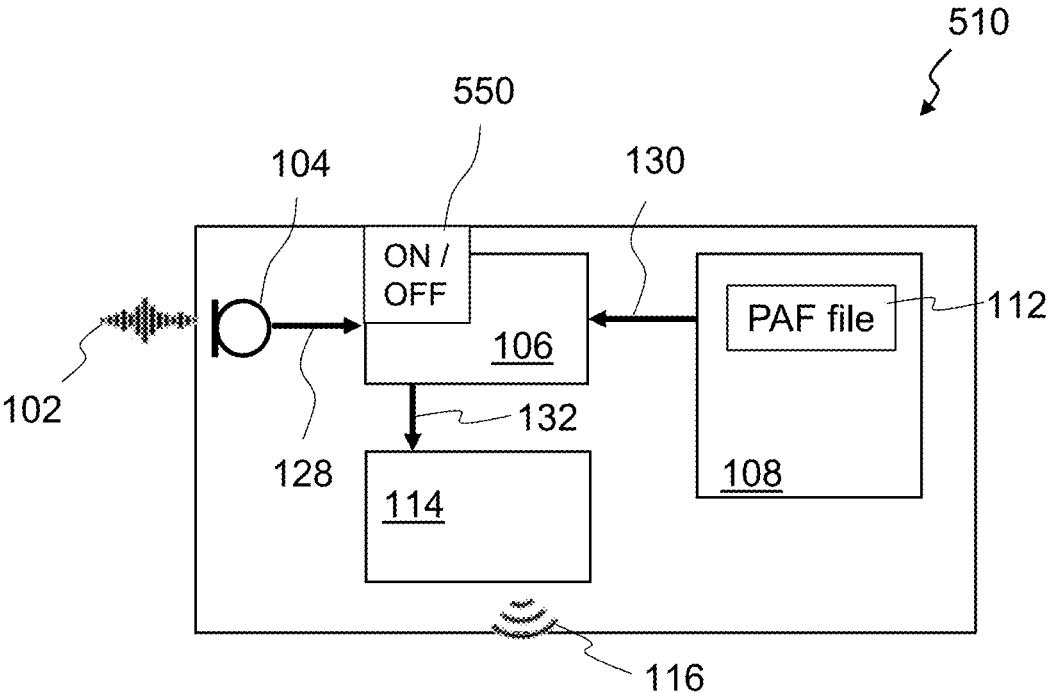
FIG. 5 illustrates an exemplary schematic diagram of a communication device.
Figure 6A:
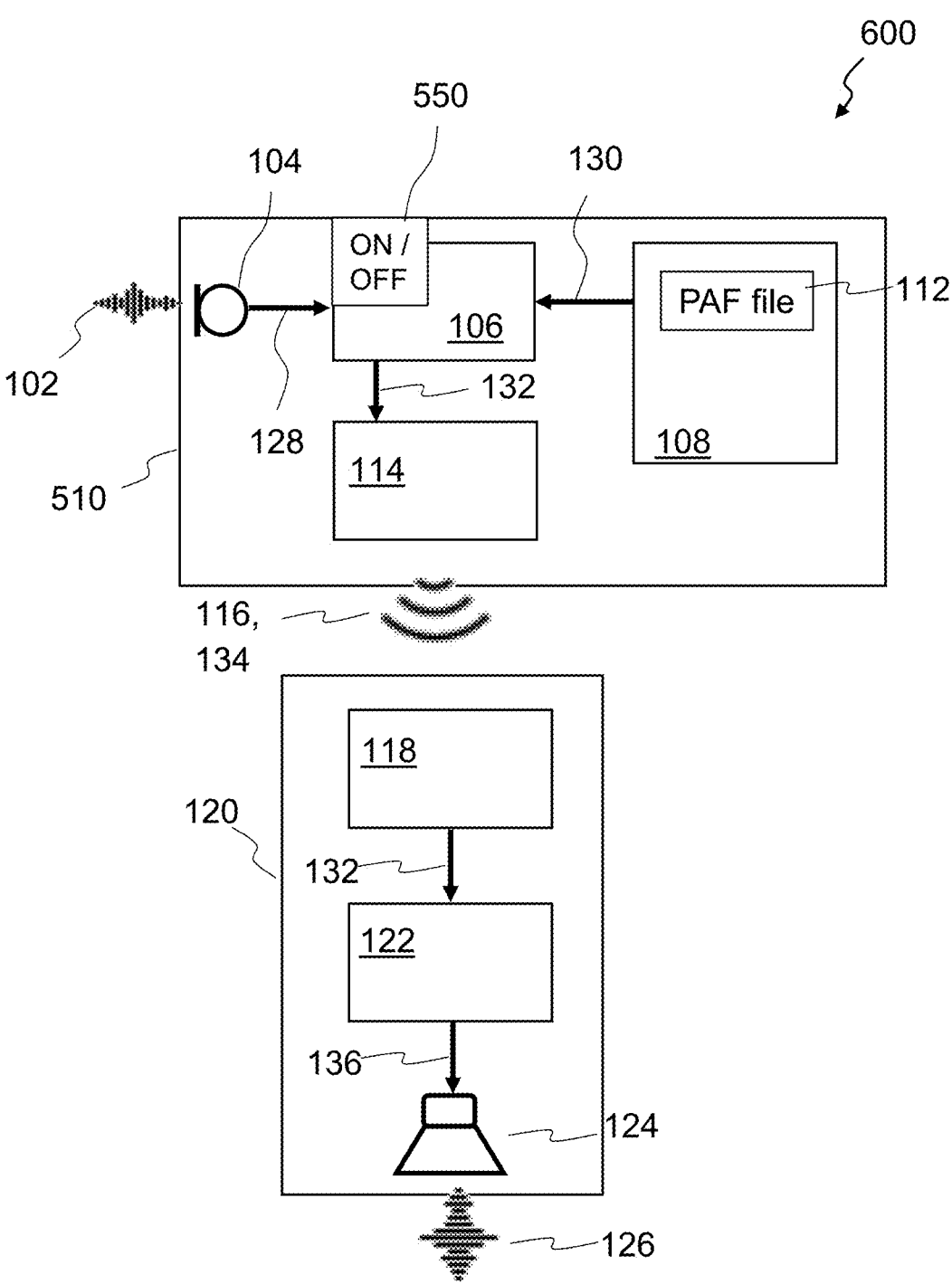
FIG. 6B illustrates an exemplary schematic diagram of a hearing aid system.
Figure 6B:
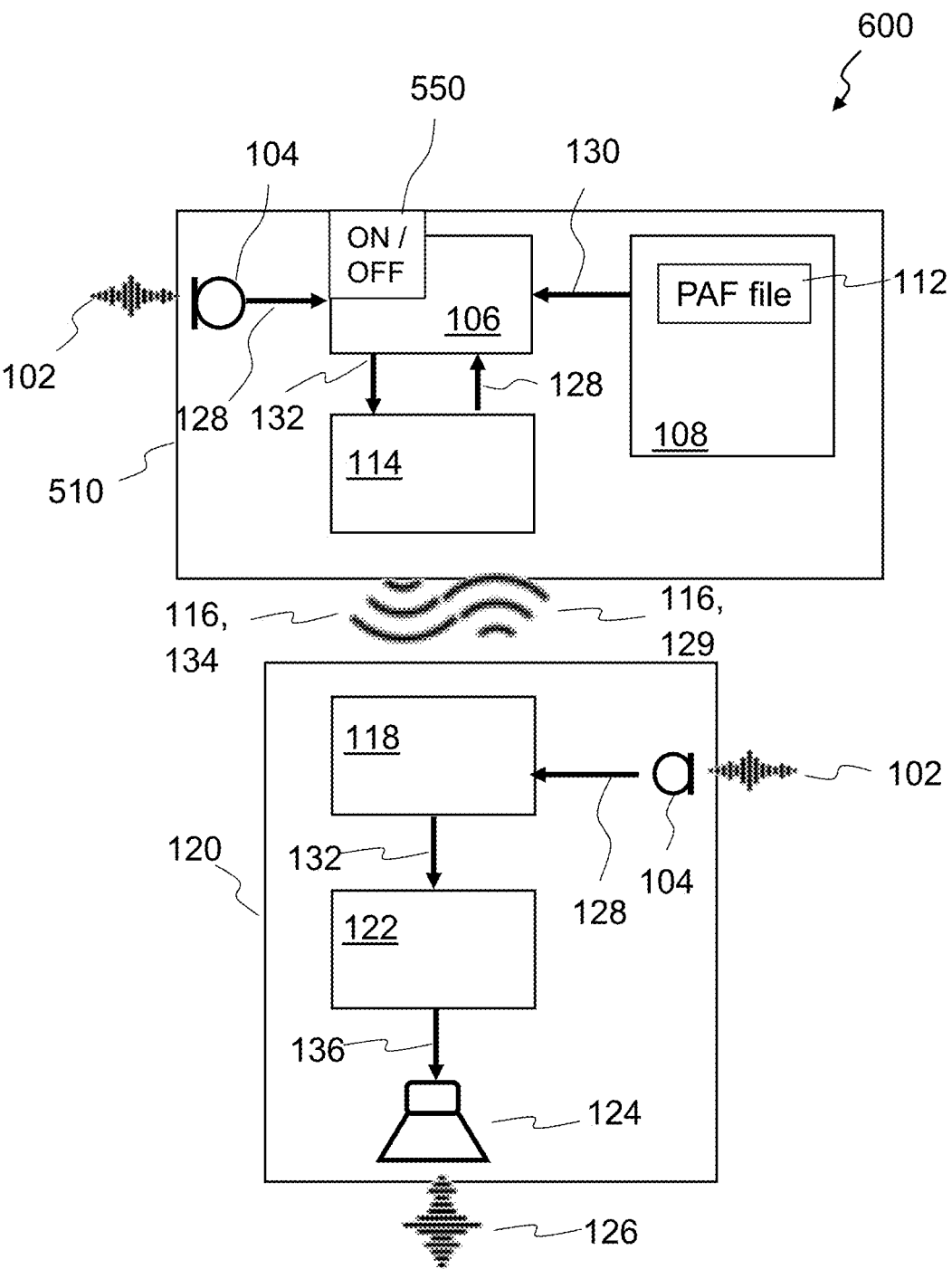
Figure 7:
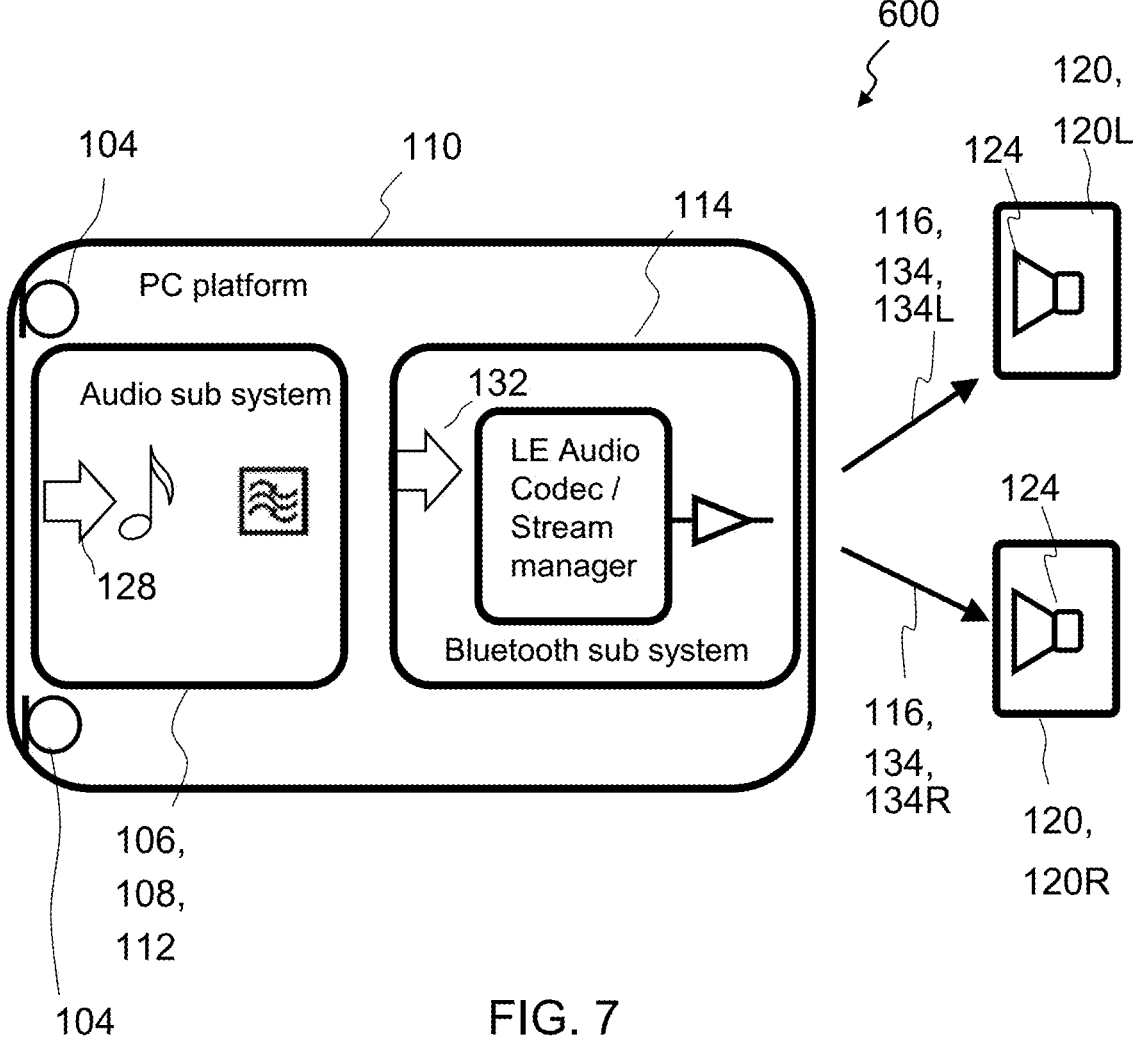
FIG. 7 illustrates an exemplary schematic diagram of a hearing aid system.

Each of FIG. 1 illustrates a communication device 110, FIG. 5. illustrates a communication device 510, each of FIG. 2 and FIG. 3 illustrates a hearing aid device 200 that includes the communication device 110 and a terminal hearing device 120, and each of FIG. 6A, FIG. 6B, and FIG. 7 illustrates a hearing aid device 600 that includes the communication device 510 and a terminal hearing device 120.

Illustratively, the communication device 110, 510, in combination with a connected terminal hearing device 120, and the corresponding hearing aid system 200, 600, respectively, enables the use of lower cost ear buds (<USD 200) as the terminal hearing device 120, as an alternative to hearing aids of the related art.

The communication device 110 may be a personal computer (PC) or any kind of computing device having a communication interface providing a communication capability with the terminal hearing device 120. This way, a larger portion of the population with hearing loss may gain access to improved hearing when using the communication device 110. By way of example, the communication device 110 may be a mobile phone, e.g., a smartphone, such as an iPhone, Android, Blackberry, etc., a Digital Enhanced Cordless Telecommunications ("DECT") phone, a landline phones, tablets, a media players, e.g., iPod, MP3 player, etc.), a computer, e.g., desktop or laptop, PC, Apple computer, etc.; an audio/video (A/V) wireless communication terminal that can be part of a home entertainment or home theater system, for example, a car audio system or circuitry within the car, remote control, an accessory electronic device, a wireless speaker, or a smart watch, or a Cloud computing device, or a specifically designed universal serial bus (USB) drive.

Illustratively, the communication device 110, 510 takes over a remarkable portion of the computational effort and audio adaptation derived from a personal audibility feature (PAF), e.g., a personal audibility curve, to the communication device 110, 510, and utilizes computing resources of the communication device 110. This enables higher quality enhanced audio and speech recognition for people with hearing impairment at an affordable cost, e.g., by using ear buds as terminal hearing devices 120.

Further illustratively, the communication device 110 may be configured to receive (e.g., wirelessly, for example via a Bluetooth sub-system) ambient sound that has been captured by the earbud microphone, decode the ambient sound, forward the decoded ambient sound, e.g., to a processor; apply the PAF auditory settings, and to loop back to the Bluetooth subsystem to send (in a second direction of a bi-directional stream) the ambient sound to which the PAF auditory settings have been applied, to the earbud speaker for playback.

Thus, two advantageous aspects may be combined: on the one hand, using the earbud microphone for capturing the sound means that the ambient sound of a user is captured, while the user may have a possibility to naturally shift focus by moving the head (and thereby the microphone in, on or near the ear) towards a sound source, and/or may provide a directionality with respect to a position of the user if, for example, a pair of earbuds are used, each with its own microphone. And on the other hand, relaying the captured ambient sound of the user to the communication device 110 means that the earbuds may be provided at an affordable cost, and that potentially improved processing resources may be provided by the communication device 110, as compared to what may be providable by a processor included in a hearing aid of the related art.

Further illustratively, the communication device 510 may be configured to capture ambient sound (in its own surroundings or environment), decode the ambient sound, forward the decoded ambient sound, e.g., to a processor; apply the PAF auditory settings, forward the sound, to which the PAF auditory settings have been applied, to a Bluetooth subsystem to send the sound to which the PAF auditory settings have been applied to an earbud speaker for playback.

Phrasing it differently, the communication device 510 may be used as an external microphone (meaning external to the earbuds, e.g., as a separate device; optionally, the external microphone may be in a remote location from the earbuds), which may provide advantages over a hearing aid having microphones only in the earbuds. For example, the communication device 510 may be arranged to capture a speaker's voice from a nearby corner of a conference room. A PC audio sub system may then process the captured audio signal, apply the user PAF profile, which may match auditory settings for a given user. The Bluetooth sub system may follow by compressing the audio signal to which the PAF profile has been applied, and by sending the audio signal to the earbuds, optionally as individual streams to left and right earbuds. The user with hearing loss, wearing earbuds, may be able to receive a clear voice signal from the far corner of the conference room where the speaker may be located. The advantage provided by the external microphone may, alternatively or in addition to a closer locatability to a target sound source, be or include a possibility to use a higher quality microphone (e.g., with lower self-noise), a special purpose microphone, e.g., a directional microphone, a noise-cancelling microphone, or a hydrophone, or a larger number of microphones. The sound capturing by the communication device 510 may be activatable on request, e.g., by manual control or by an acoustic activation signal received in the at least one microphone. When the sound capturing is activated, the captured sound may be processed as described above and forwarded to the earbuds, where it may be the only sound signal that is broadcasted by the earbud loudspeakers, or the sound signal captured and processed by the communication device 510 may be overlaid by a sound signal from an immediate environment of the user, which may be captured by microphones in the earbuds and, for example, processed in the communication device 510 as described above. Thus, a user may for example receive an audio signal including speech from a conference speaker, and, alternatively or at the same time, an audio signal from a vicinity of the user, e.g., speech from a seat neighbour.

The PAF file may further contain an audio reproduction feature of the terminal hearing device 120 allowing an improved user-terminal hearing device-pair specific audio amplification.

In other words, the hearing aid system 200 employs as such conventional terminal hearing devices 120, e.g., ear buds, headphones, etc., but the audio processing, the artificial intelligence (AI), the personal audibility curve and the acoustic setup of the terminal hearing device 120 are outsourced to the communication device 110 that is external to the terminal hearing device 120. This way, a low-cost hearing aid system 100 can be provided. Further, an adaptation and improved tailored audio quality is provided for a general population, e.g., improved tuning, improved AI feature set for speech recognition and clarity, improved noise cancelling, improved feedback suppression, and/or improved binaural link.

Further, the communication device 110 may personalize the hearing thresholds per user and terminal hearing device 120, e.g., generate an audibility preference profile stored in the PAF file. The computing device 110 may define the Personal Audibility Feature (PAF) file 112 specific to the hearing impairment of the user of the hearing aid system 200 and the audio reproduction feature(s) of the terminal hearing device 120. As an illustrative example, the PAF file 112 may include audiograms, but also other features, e.g., phonetic recognition WIN/HINT tests of a user. The PAF file may include an audiogram representing a hearing impairment of the user in graphical format or in tabular form in the PAF file. The audiogram indicates a compensation amplification (e.g., in decibels) needed as a function of frequency (e.g., in Hertz) across the audible band to reduce the hearing impairment of the user.

The PAF file 112 may be shared between a plurality of communication devices 110, e.g., via a server, e.g., a cloud server. This way, different communication devices 110 supporting a hearing aid application (in the following also denoted as App) using the PAF file 112 may be used. The calibration of the PAF file 112 may be done by an audiologist connecting to the application program running on the communication device 110 to guide the test procedure. Alternatively, or in addition, an AI-based calibration mechanism on the communication device 110 defining the test procedure may be used.

The PAF file 112 may include personal audibility feature of the predetermined user and audio reproduction feature of the terminal hearing device 120. The PAF file 112 may be a single sharable file that may include the personal audibility feature of the user and the audio reproduction feature of the terminal hearing device 120. As an example, the personal audibility feature may include a personal audibility curve, e.g., a personal equal loudness contour according to ISO 226:2003. The audio reproduction feature may include information of a unique ID, a name, a network addresses and/or a classification of the terminal hearing device 120. The audio reproduction feature may also include an audio mapping curve of the speaker 124 of the terminal hearing device 120. Here, an audio mapping curve may be understood as an acoustic reproduction accuracy of a predetermined audio spectrum by the speakers 124 of the terminal hearing device 120.

As an example, the PAF file 112 may have the following content: a terminal hearing device identification, user audiogram(s), user WIN/HINT test results. These test results may be used automatically to trim the various audio algorithms, e.g., equalizer, frequency compression, AI-based speech enhancement, as an example. The PAF file 112 may also include target audio correction algorithm coefficients (for known algorithms). The target audio correction algorithm coefficients may be trimmed manually by an audiologist or the user of the hearing aid system. The communication device 110 may support using new algorithms for a hearing aid. The new algorithms may use raw test data stored in the PAF file 112 and may store target audio correction algorithm coefficients in follow up revisions in the PAF file 112.

The communication device 110 of FIG. 1 includes a wireless communication terminal 114 (which may include a wireless communication terminal interface), at least one processor 106 configured to receive an audio signal 128 from the wireless communication terminal 114, and a storage element 108 coupled to the processor 106.

The storage element 108 storing the PAF file 112 may include one or more memories, for example a volatile, non-volatile, magnetic, optical, or electrical media, such as read-only memory (ROM), random access memory (RAM), electrically-erasable programmable ROM (EEPROM), flash memory, or the like, and/or a cloud-based memory with a buffer integrated into the communication device 110 to reduce, mitigate, or eliminate lagging.

The storage element 108 has a personal audibility feature (PAF) file 112 stored therein. The PAF file 112 includes a personal audibility feature of a predetermined user. The PAF file 112 may be received in the processor 106, e.g., as a data stream 130 via the coupling, for example upon request, and/or after a coupling of a terminal hearing device 120 to the communication device 110.

The processor 106 is further configured to modify the audio signal 128 according to the PAF file 112 and to provide an audio stream 132 based on the modified audio signal 128 to the wireless communication terminal 132. The processor 106 may further be configured to adapt the audio signal 128 to the PAF file 112.

The processor 106 may include a controller, computer, software, etc. The processor 106 modifies, for example amplifies and/or frequency-shifts, the audio signal 102. The amplification can vary with frequency, e.g., according to the PAF file 112. This way, the communication device 110 provides a personalized audible signal to the user of the terminal hearing device 120. As another way to phrase it, the processor 106 may process the digital audio signal 128 to shape the frequency envelope of the digital audio signal 128 to enhance signals based on the PAF filed 112 to improve their audibility for a user of the hearing aid system 200.

As an example, the processor 106 amplifies the audio signal 102 in the frequency band associated with human speech more than the audio signal 102 associated with environmental noise. This way, the user of the hearing aid system 200 can hear and participate in conversations.

The processor 106 may include an algorithm that sets a frequency-dependent gain and/or attenuation for the audio signal 128 based on the PAF file 112.

The processor 106 in combination with the PAF file 112 may be adapted for adjusting a sound level pressure and/or frequency-dependent gain of the audio signal 128. In other words, the processor 106 amplifies the audio signal 128 based on the information stored in PAF file 112, resulting in the modified audio signal 132.

The processor 106 provides the modified audio signal 132 to the wireless communication terminal 114. The wireless communication terminal 114 provides the amplified audio signal 132 in audio packets 134 to the wireless communication terminal 118 of the terminal hearing device 120.

The processor 106 may also include a classifier, and a sound analyzer. The classifier analyzes the audio signal 128 received via the wireless communication terminal 114. The classifier classifies the hearing condition based on the analysis of the characteristics of the received sound. For example, the analysis of the picked-up sound can identify a quiet conversation, talking with several people in a noisy location; watching TV; etc. After the hearing conditions have been classified, the processor 106 can select and use a program to process the audio signal 128 according to the classified hearing conditions. For example, if the hearing condition is classified as a conversation in a noisy location, the processor 106 can amplify the frequency of the received audio signal 102 based on information stored in the PAF file 112 associated with the conversation and attenuate ambient noise frequencies.

The processor 106 may be a single digital processor 106 or may be made up of different, potentially distributed processor units. The processor 106 may be at least one digital processor 106 unit. The processor 106 may include one or more of a microprocessor, a microcontroller, a digital processor 106 (DSP), an application specific integrated circuit (ASIC), a field-programmable gate array (FPGA), discrete logic circuitry, or the like, appropriately programmed with software and/or computer code, or a combination of special purpose hardware and programmable circuitry. The processor 106 may be further configured to differentiate sounds, such as speech and background noise, and to process the sounds differently for a seamless hearing experience. The processor 106 can further be configured to support cancellation of feedback or noise from wind, ambient disturbances, etc. The processor 106 may further be configured to access programs, software, etc., which may be stored in the storage element 108 of the communication device 110 or in an external storage element, e.g., in a computer network, such as a cloud.

FIG. 2 shows an exemplary schematic diagram of a hearing aid system 200 that includes the communication device 110 and a terminal hearing device 120 that is coupled to the communication device 110.

The terminal hearing device 120 may include a wireless communication terminal 118 (which may include a wireless communication terminal interface) configured to be communicatively coupled to the wireless communication terminal 114 of the communication device 110, a speaker 124 and at least one processor 122 coupled between the wireless communication terminal 118 and the speaker 124.

The terminal hearing device 120 includes a speaker 124, also referred to as loudspeaker, sound output device or as sound generation device, e.g., an audio speaker or other type of transducer that generates sound waves or mechanical vibrations that the user perceives as sound.

The processor 122 may be configured to provide a signal 136 to the speaker 124 from audio packets 134 received by the wireless communication terminal 118. The processor 122 may for example be configured to apply dynamic user preferences like a general volume adjustment, or the like. The speaker 124 provides a PAF-modified audio signal 126 to the predetermined user of the hearing aid system 200. In other words, the PAF-modified audio signal 126 may be a modified, for example at least partially amplified (alternatively or additionally for example at least partially frequency-shifted) version of the audio signal 102, wherein the modification (e.g., amplification) is based on the information stored in the PAF file 112 correlating to features of a hearing impairment of the user of the hearing aid system 200, and optionally to audio reproduction features of the terminal hearing device 120.

The terminal hearing device 120 may include at least one earphone. The terminal hearing device 120 may be an in-the-ear phone (also referred to as earbuds), as an example. As an example, the terminal hearing device 120 may include a first terminal hearing unit and a second terminal hearing unit. As an example, the first terminal hearing unit may be configured for the left ear of the user, and the second terminal hearing unit may be configured for the right ear of the user, or vice versa. However, the user may also have only one ear, or may have only one ear having a hearing impairment. The terminal hearing device 120 may include a first terminal hearing unit that may include a first communication terminal interface 118 for a wireless communication link with the communication device 110. Further, the first and second terminal hearing units may include second communication terminals respectively for a wireless communication link between the first and second terminal hearing units. The terminal hearing device 120 may include or be any kind of headset that includes a communication terminal interface 118 for a wireless communication link with the communication device 110.

Optionally, a plurality of terminal hearing devices 120 may be coupled to the communication device 110, either for example two terminal hearing devices 120 per user, e.g., for left ear and right ear (which may optionally be considered as forming a pair of hearing units of a single terminal hearing device 120, as described above, for example in a case where it is compulsory to use both units together), and/or one or more terminal hearing devices 120 per user of a plurality of users. For each user, optionally for each ear of the user or, respectively, for each terminal hearing device 120 of each user, an individual PAF file 112 may be stored in the storage element 108. The individual PAF file 112 may include an identification of the user, the user's ear, and/or of the terminal hearing device 120, allowing to select the matching PAF file 112 upon coupling of a specifying terminal hearing device 120 to the communication device 110.

The terminal hearing device 120 includes a microphone 104 configured to convert sound 102 (also referred to as received audio signal 102) received from an audio source into the (e.g., digital) audio signal 128.

The terminal hearing device 120 further includes a wireless communication terminal 118 configured to transmit the audio signal 120 to the wireless communication terminal 114 of the communication device 110, for example via a bi-directional wireless link 116.

The wireless communication terminals 114, 118 of the communication device 110 and the terminal hearing device 120, respectively, may be configured as a short range mobile radio communication interface such as e.g., a Bluetooth interface, e.g., a Bluetooth Low Energy (LE) interface, ZigBee, Z-Wave, Wi-Fi HaLow/IEEE 802.11ah, and the like. By way of example, one or more of the following Bluetooth interfaces may be provided: Bluetooth V 1.0A/ 1.0B interface, Bluetooth V 1.1 interface, Bluetooth V 1.2 interface, Bluetooth V 2.0 interface (optionally plus EDR (Enhanced Data Rate), Bluetooth V 2.1 interface (optionally plus EDR (Enhanced Data Rate), Bluetooth V 3.0 interface, Bluetooth V 4.0 interface, Bluetooth V 4.1 interface, Bluetooth V 4.2 interface, Bluetooth V 5.0 interface, Bluetooth V 5.1 interface, Bluetooth V 5.2 interface, and the like. Thus, illustratively, the hearing aid system 200 applies PAF on audio samples that go from or to Bluetooth Low Energy (BLE) audio (e.g., compressed) streams or any other as short range mobile radio communication audio stream as a transport protocol.

Wireless technologies allow wireless communications between the terminal hearing device 120 and the communication device 110. The communication device 110 is a terminal hearing device-external device, e.g., a personal computer, a mobile phone, tablet, iPod, etc.) that transmits audio packets 134 to the terminal hearing device 120. The terminal hearing device 120 streams audio from the audio source, e.g., using an Advanced Audio Distribution Profile (A2DP). For example, a terminal hearing device 120 can use Bluetooth Basic Rate/Enhanced Data Rate™ (Bluetooth BR/EDR™M) to stream audio streams from a smartphone (as communication device 110) configured to transmit audio using A2DP. When transporting audio data, Bluetooth Classic profiles, such as the A2DP or the Hands Free Profile (HFP), offer a point-to-point link from the communication device 110 to the terminal hearing device 120. Further exemplary Bluetooth standards that may be used include Bluetooth LE Audio Basic Audio Profile (BAP) profile, Hearing Accessibility Profile (HAP) and Low Complexity Communication Codec (LC3).

Since the wireless communication link 116 between the wireless communication terminals 114 and 118 may typically require that the audio signal 128 and 132, respectively, is provided in accordance with a corresponding wireless standard, these audio signals that have been modified to be wirelessly transmittable are referred to as audio packets 129 (instead of audio signal 128) and audio packet 134 (instead of audio signal 132), respectively. After having been received at the destination, the audio packet 129 may be converted back to the audio signal 128, and the audio packet 134 may be converted back to the audio signal 132, respectively.

As an example, the microphone 104 may provide a digital audio signal 128 associated with the received audio signal 102 from the scene (also denoted as environment) of the terminal hearing device 120 and forward it wirelessly to the communication device 110. The processor 106 of the communication device 110 may modify, e.g., amplify, the audio signal 128 based on the PAF file 112, and optionally on a machine learning algorithm. Illustratively, the modification (e.g., at least partial amplification) of the audio signal corresponds to information stored in the PAF file 112.

In case the machine learning algorithm is used, the processing in the processor 106 may include, in addition to the audio signal 128 and the information stored in the PAF file 112, inputting context data into a machine learning algorithm. The context data may be derived from the audio signal 102, e.g., based on a noise level or audio spectrum.

The machine learning algorithm may be trained with historical context data to classify the terminal hearing device 120, e.g., as one of a plurality of potential predetermined terminal hearing devices. The machine learning algorithm may include a neuronal network, a statistical signal processing and/or a support vector machine. In general, the machine learning algorithm may be based on a function that has input data in form of context data and that outputs a classification correlated to the context data. The function may include weights, which may be adjusted during training. During training, historical data or training data, e.g., historical context data and corresponding to historical classifications may be used for adjusting the weights. However, the training may also take place during the usage of the hearing aid system 200. As an example, the machine learning algorithm may be based on weights, which may be adjusted during learning. When a user establishes a communication connection between a communication device 110 and the terminal hearing device 120, the machine learning algorithm may be trained with context data and the metadata of the terminal hearing device 120. An algorithm may be used to adapt the weighting while learning from user input. As an example, the user may manually choose another speaker to be listened to, e.g., active listening or conversating with a specific subset of individuals. In addition, user feedback may be reference data for the machine learning algorithm.

The metadata of the terminal hearing device 120 and the context data of the audio signal may be input into the machine learning algorithm. For example, the machine learning algorithm may include an artificial neuronal network, such as a convolutional neuronal network. Alternatively, or in addition, the machine learning algorithm may include other types of trainable algorithm, such as support vector machines, pattern recognition algorithm, statistical algorithm, etc. The metadata may be audio reproduction feature of the terminal hearing device and may contain information about unique IDs, names, network addresses, etc.

FIG. 3 shows another illustration of the hearing aid system 200 as a high-level solution block diagram, with an emphasis on how the hearing aid system 200 works.

The communication device 110, also referred to in the figure as PC platform or earbud assistant, is used to apply the PAF profile corresponding to the user of the terminal hearing device 120 (the earbud(s)).

Ambient sound is captured by the earbud microphone 104; sent to the communication device 110 to be received by the wireless communication terminal 114 (the Bluetooth sub system), as part of a bi-directional stream 134, 129 (via the wireless connection 116). The audio packets 129 may be decoded by the wireless communication terminal 114 of the communication device 110 (for example, as indicated in FIG. 3, by an LE audio codec/stream manager), and forwarded, as audio signal 128, to the audio sub system, which may include the processor 106 and the storage element 108 with the PAF file 112; to apply the PAF auditory settings, thereby forming the modified audio signal 132. Thereafter, the processing loops back to the Bluetooth subsystem to encode the modified audio signal 132 into audio packets 134 in order to send them to the earbud speaker 120 for decoding by the wireless communication terminal 118 (not shown in FIG. 3) and for playback via the speaker 124.

Figure 4:
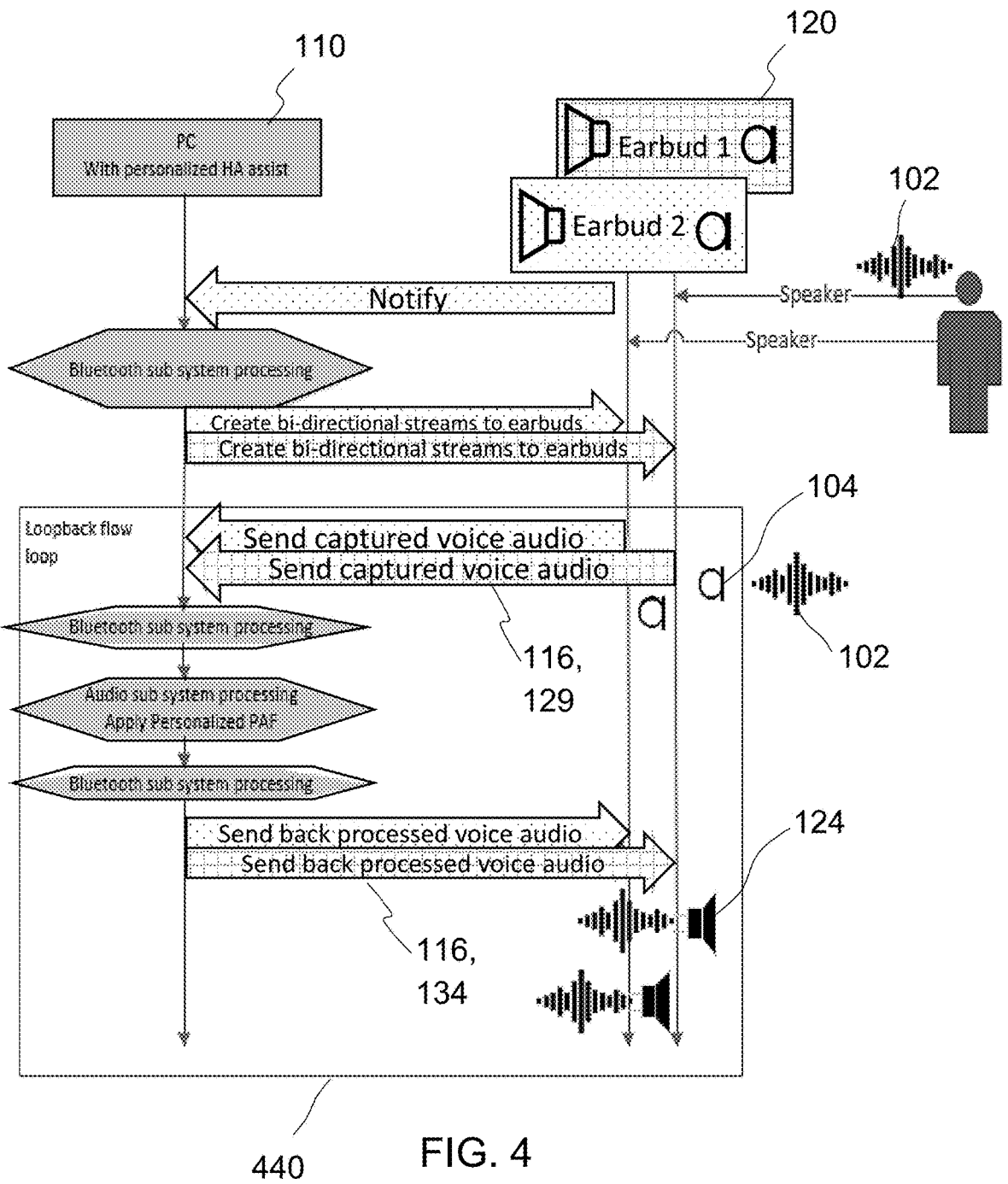
FIG. 4 illustrates an exemplary flow chart for a hearing aid system.

FIG. 4 illustrates an exemplary flow chart for hearing aid system 200, providing details on a message flow, processing flow and a trigger for the AI algorithms.

As a pre-condition, the communication device 110 (e.g., the PC) maintains a control connection with the terminal hearing device 120 (in this case, two earbuds).

One of the earbuds detects a voice capture (e.g., any kind of voice capture, a voice capture above a minimum level, a capture of a key phrase, or the like) and notifies the PC to trigger activation of the PC loopback processing. Alternatively (not shown here), the communication device 110 may be configured for sound capture simply by turning the earbuds on, by pressing a button, or the like. The PC then configures and creates bi-directional streams with each earbud with the required Bluetooth LE Audio codec parameters for encoder and decoder. All of this happens before the loopback flow loop 440 is entered.

When the streams are ready, the system moves to the 'loopback flow loop' 440, in which sound 102, e.g., voice/ speech, is continuously captured by the two earbuds 120 and sent to the PC 110 wirelessly over Bluetooth LE Audio (the bi-directional wireless connection 116). The received sound (e.g., voice/speech) is then processed by the Audio sub system, for example by the processor 106, which may for example employ AI, and moved to the Bluetooth sub system to be sent back (as audio packets 134) to each earbud 120. The audio processing is utilizing the PAF (Personalized Audibility Features) that may be stored, for example as a PAF file 112, in a storage element 108 in the communication device 110, and which addresses the specific user profile.

The communication device 510 of FIG. 5 includes various elements and structures that are similar or identical in their functionality to the corresponding elements and structures of the communication device 110 of FIG. 1. Duplicate descriptions are omitted.

The communication device 510 includes at least one microphone 104 configured to convert sound 102 received from an audio source into at least one audio signal 128, one per microphone 104, at least one processor 106 configured to receive the at least one audio signal 128, a wireless communication terminal 114, and a storage element 108 coupled to the processor 106 having a personal audibility feature (PAF) file 112 stored therein, the PAF file 112 including a personal audibility feature of a predetermined user. The processor 106 is further configured to modify the at least one audio signal 128 according to the PAF file 112 and to provide an audio stream 132 based on the modified audio signal to the wireless communication terminal 114, wherein the provision of the audio stream 132 is activatable by manual control or by an acoustic activation signal received in the at least one microphone 104. The activatability/deactivatability is indicated by the "ON/OFF" member 550 having an interface with both the microphone 104 and with an outside of the communication device 510. It is to be understood that only one of the control mechanisms may be provided, and that "manual control" includes any kind of non-automatic activation that requires a deliberate action by the user, however not necessarily a manual activation, and not necessarily a manual action performed on the communication device itself. Instead, an activation/deactivation command may for example be received in the communication device 110 via the wireless communication terminal 114.

The communication device 510 of FIG. 5 is suitable for being used as an external microphone 104 (meaning external to earbuds, e.g., as a separate device; optionally, the external microphone may be in a remote location from the earbuds), as described above. The provision of the audio stream 132 may be switched on when a user decides it to be beneficial to receive the audio stream 132 in a terminal hearing device 120, for example alternative to an audio stream generated using an audio signal received by a microphone in the terminal hearing device 120, or in addition to the audio signal received by a microphone in the terminal hearing device 120, e.g., as overlaid audio signals.

Processing of the audio signal 128 may be similar to the processing of the audio signal 128 in the communication device 110, except for the audio signal 128 in the communication device 110 of FIG. 5 being received by a microphone 104 that is included in or coupled to the communication device 110, and is external to a terminal hearing device 120.

Each of FIG. 6A and FIG. 6B schematically illustrates a hearing aid system 600 including the communication device 510 and a terminal hearing device 120. The configuration and functionality of the terminal hearing device 120 may be similar or identical to the terminal hearing device 120 of FIG. 2, with the exception that the terminal hearing device 120 of FIG. 6A may not necessarily be provided with a microphone 104, i.e., it may be configured to receive its audio stream only via the wireless communication terminal 118, e.g., from the communication device 110. The hearing aid system 600 of FIG. 6B combines the functionality of the hearing aid system 200 of FIG. 2 with the functionality of the hearing aid system 600 of FIG. 6A, in that two audio streams 136, one from the microphone 104 of the communication device 110 and one from the microphone 104 of the terminal hearing device 120, may alternatively or jointly (as an overlay, for example with adjustable weights) be provided at the speaker 124.

Providing the audio stream 132 using the microphone 104 of the communication device 110 may provide the audio stream 128 corresponding to the audio source 102 with a higher signal quality than a signal quality of an audio stream 128 based on the sound of the audio source 102 received by a hypothetical or actually present hearing device microphone 104.

The difference in signal quality between the audio stream using the at least one microphone 104 of the communication device 110 and the audio stream using the hearing device microphone originates in at least one configuration difference between the communication device 110 and the at least one terminal hearing device 120. For example, the at least one microphone 104 of the communication device 110 may be closer to the audio source than the terminal hearing device 120, and/or the at least one microphone 104 of the communication device 110 includes a higher number of microphones (e.g., more than one or more than two microphones 104, for example four microphones 104) than the terminal hearing device 120, that the at least one microphone 104 of the communication device 110 is of higher quality than the microphone of the terminal hearing device 120, for example with a lower self-noise, a lower impedance, and/or with a higher maximum acceptable sound pressure level (SPL), and/or that the at least one microphone 104 of the communication device 110 is a special-purpose microphone, and the microphone of the terminal hearing device is not, for example a noise cancelling microphone, a directional microphone, a noise-cancelling microphone, or a hydrophone.

FIG. 7 illustrates the hearing aid system 600 as a high-level solution block diagram. The communication device 100 (indicated as PC platform) is used as an external (to the terminal hearing device 120) remote microphone 104, in this case two microphones 104 are provided.

Capturing a speaker's voice from, e.g., one corner of a conference room, with the microphones 104, the processor 106 (also referred to as PC audio sub system) then processes the captured audio signal 128, applying the user PAF profile stored as a PAF file 112 in a storage element 108. The PAF profile matches the auditory settings for the user.

A resulting modified audio signal 132 may be provided to the wireless communication terminal 114 (the Bluetooth sub system including an LE audio codec/stream manager), where the audio signal 132 may be compressed and/or encoded (or, more generally, be modified to conform to the wireless transmission standard that will be employed) and sent as audio packets 134, in the case of two receiving terminal hearing devices 120, e.g., for left and right ear, as two individual audio streams 134R, 134L, to the earbuds 120, e.g., to the left earbud 120L and to the right earbud 120R. The user with hearing loss, wearing earbuds 120, will then be able to receive a clear voice signal from the other (e.g., remote) corner of the conference room, where the human speaker is lecturing.

Figure 8:
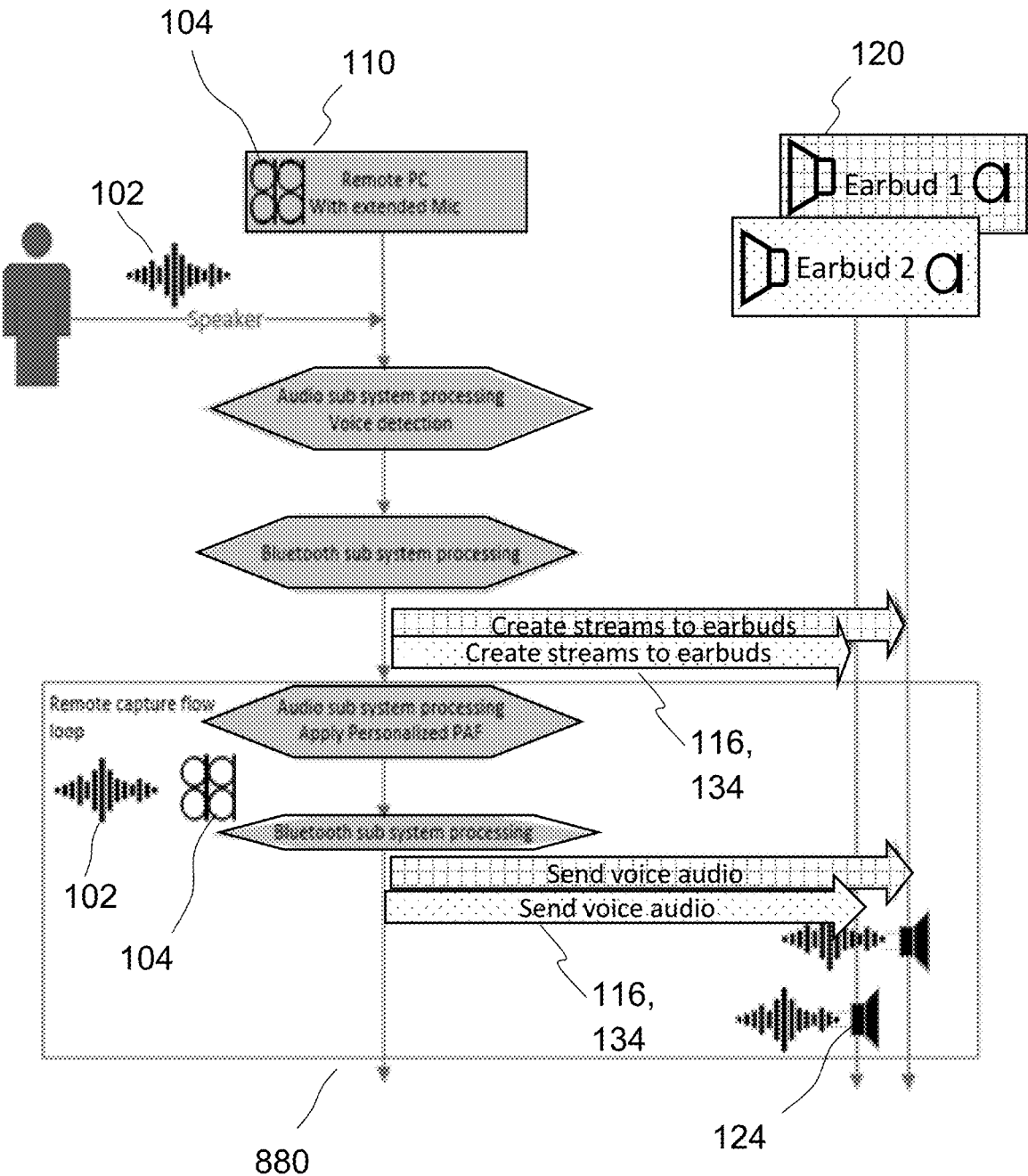
FIG. 8 illustrates an exemplary flow chart for a hearing aid system.

FIG. 8 illustrates an exemplary flow chart for hearing aid system 600, providing details on a message flow, processing flow and a trigger for the AI algorithms.

As a pre-condition, the communication device 110 (e.g., the PC) maintains a control connection with the terminal hearing device 120 (in this case, two earbuds).

The PC audio sub system is configured to capture sound 102 from an audio source, e.g., from a remote speaker in a conference room. The activation of the remote speaker capturing may be manually controlled or automatically triggered, e.g., via key phrase detection.

Once the remote PC 110 detects the capturing trigger, it activates the audio sub system AI processing to begin processing the remote speaker's voice/speech that the communication device 110 receives via the microphone(s) 104 (four exemplary microphones 104 are shown in FIG. 8).

The audio sub system then notifies the Bluetooth sub system that a voice signal 134 for the earbuds 120 is available. The Bluetooth sub system creates voice streams 134 with proper Bluetooth LE Audio encoding with the two earbuds 120, one stream 134 per earbud 120. All of this happens before the remote capture flow loop 880 is entered.

When the streams 134 are ready, the system moves to the 'remote capture flow loop' 880, in which sound 102, e.g., a voice signal, is continuously captured; processed by the Audio sub system AI, and moved to Bluetooth sub system to be sent to each earbud 120 wirelessly over Bluetooth LE Audio. The audio processing is utilizing PAF (Personalized Audibility Features) that may be stored, for example as a PAF file 112, in a storage element 108 in the communication device 110, and which addresses the specific user profile.

FIG. 9 shows a flow diagram 900 of a method of modifying an audio signal. The method includes receiving, via a wireless communication terminal of a communication device, an audio signal in a processor of the communication device (in 910), retrieving, from a storage element of the communication device, a personal audibility feature (PAF) file comprising a personal auditability feature of a predetermined user (in 920), modifying the audio signal according to the PAF file (in 930), and providing an audio stream based on the modified audio signal to the wireless communication terminal (in 940).

FIG. 10 shows a flow diagram 1000 of a method of modifying an audio signal. The method includes converting, in a communication device, sound received by at least one microphone from an audio source into at least one audio signal, one per microphone (in 1010), retrieving, from a storage element of the communication device, a personal audibility feature (PAF) file comprising a personal auditability feature of a predetermined user (in 1020), modifying the at least one audio signal according to the PAF file and forming an audio stream based on the modified audio signal (in 1030), activating, by manual control or by an acoustic activation signal received in the at least one microphone, a provision of the audio stream (in 1040), and providing the audio stream to a wireless communication terminal of the communication device (in 1050).

A computer-readable medium may be provided. For example, instructions for executing the above described processes may be part of a program that may be executed in the processor of the communication device of the hearing aid system. The computer-readable medium may be a storage element of this communication device. The program also may be executed by the processor of the communication device and the computer-readable medium may be a storage element of the communication device.

In general, a computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g., the Internet, which allows downloading a program code. The computer-readable medium may be a non-transitory or transitory medium.

As used herein, a program is a set of instructions that implement an amplification algorithm for setting the audio frequency shaping or compensation provided in the processor. The amplification algorithms may also be referred to as "gain-frequency response" algorithms.

EXAMPLES

The examples set forth herein are illustrative and not exhaustive.

Example 1 may be a communication device. The communication device may include a wireless communication terminal, at least one processor configured to receive a signal representing an audio signal from the wireless communication terminal, and a storage element coupled to the processor having a personal audibility feature (PAF) file stored therein, the PAF file including a personal audibility feature of a predetermined user, wherein the processor is further configured to modify the signal representing the audio signal according to the PAF file and to provide a further signal representing an audio stream based on the modified signal to the wireless communication terminal.

In Example 2, the subject matter of Example 1 may optionally include that the modification corresponds to the information stored in the PAF file, the PAF file further including an audio reproduction feature of a predetermined terminal hearing device.

In Example 3, the subject matter of Example 2 may optionally include that the audio reproduction feature includes at least one of a group of audio reproduction features of the predetermined terminal hearing device, the group including information of a unique ID, a name, a network address, and a classification.

In Example 4, the subject matter of any of Examples 1 to 3 may optionally include that the wireless communication terminal is configured for bidirectional communication.

In Example 5, the subject matter of any of Examples 1 to 4 may optionally include that the wireless communication terminal is further configured to transmit the further signal representing the audio stream to a terminal hearing device.

In Example 6, the subject matter of any of Examples 1 to 5 may optionally include that the wireless communication terminal is further configured to receive the signal representing the audio signal from a terminal hearing device.

In Example 7, the subject matter of any of Examples 1 to 6 may optionally include that the storage element has a further PAF file stored therein, the further PAF file including a further personal audibility feature of the predetermined user, wherein the personal audibility feature of the PAF file is related to a first ear of the user and the further personal audibility feature of the further PAF file is related to a second ear of the user.

In Example 8, the subject matter of any of Examples 1 to 7 may optionally include that the processor is configured to receive a signal representing a further audio signal from the wireless communication terminal, and that the processor is further configured to modify the signal representing the further audio signal according to the further PAF file and to provide a yet further signal representing an audio stream based on the modified further signal to the wireless communication terminal.

In Example 9, the subject matter of any of Examples 1 to 8 may optionally include that the wireless communication terminal is configured to transmit the further signal representing the audio stream to a terminal hearing device corresponding to the first ear of the user, and further configured to transmit the yet further signal representing the audio stream to a further terminal hearing device corresponding to the second ear of the user.

In Example 10, the subject matter of any of Examples 1 to 9 may optionally include that the signal representing the audio signal originates from a terminal hearing device located at the first ear of the user, and the signal representing the further audio signal originates from a further terminal hearing device located at the second ear of the user, wherein the processor is further configured to jointly analyze the signal representing the audio signal and the signal representing the further audio signal and to perform noise and/or target sound recognition according to location-dependent differences between the signal representing the audio signal and the signal representing the further audio signal, wherein the processor is configured to modify the signal representing the audio signal and the signal representing the further audio signal according to the PAF file and the recognized target sound and/or noise.

In Example 11, the subject matter of any of Examples 1 to 10 may optionally include that the personal audibility feature includes a personal audibility curve.

In Example 12, the subject matter of any of Examples 1 to 11 may optionally include that the processor is configured to modify the signal representing the audio signal according to the PAF file and a machine learning algorithm.

Example 13 is a hearing aid system. The hearing aid system may include a communication device and a terminal hearing device, the communication device including a wireless communication terminal, at least one processor configured to receive a signal representing an audio signal from the wireless communication terminal, and a storage element coupled to the processor having a personal audibility feature (PAF) file stored therein, the PAF file including a personal audibility feature of a predetermined user, wherein the processor is further configured to modify the signal representing the audio signal according to the PAF file and to provide a further signal representing an audio stream based on the modified signal to the terminal hearing device via the wireless communication terminal.

In Example 14, the subject matter of Example 13 may optionally include that the terminal hearing device includes a microphone configured to convert sound received from an audio source into the signal representing the audio signal.

In Example 15, the subject matter of Example 13 or 14 may optionally include that the terminal hearing device further includes a wireless communication terminal configured to transmit the signal representing the audio signal to the wireless communication terminal of the communication device.

In Example 16, the subject matter of any of Examples 13 to 15 may optionally include that the wireless communication terminals of the communication device and of the terminal hearing device are configured as short range interfaces.

In Example 17, the subject matter of any of Examples 13 to 16 may optionally include that wireless communication terminals of the communication device and of the terminal hearing device are configured as Bluetooth interfaces, in particular a Bluetooth Low Energy interfaces.

In Example 18, the subject matter of any of Examples 13 to 17 may optionally include that the terminal hearing device includes at least one earphone.

Example 19 is a communication device. The communication device may include at least one microphone configured to convert sound received from an audio source into at least one signal representing an audio signal, one per microphone, at least one processor configured to receive the at least one signal representing the audio signal, a wireless communication terminal, and a storage element coupled to the processor having a personal audibility feature (PAF) file stored therein, the PAF file including a personal audibility feature of a predetermined user, wherein the processor is further configured to modify the at least one signal representing the audio signal according to the PAF file and to provide a further signal representing an audio stream based on the modified signal to the wireless communication terminal, wherein the provision of the further signal representing the audio stream is activatable by manual control or by an acoustic activation signal received in the at least one microphone.

In Example 20, the subject matter of Example 19 may optionally include that the personal audibility feature includes a personal audibility curve.

In Example 21, the subject matter of Example 19 or 20 may optionally include that the modification corresponds to the information stored in the PAF file, the PAF file further including an audio reproduction feature of a predetermined terminal hearing device.

In Example 22, the subject matter of Example 21 may optionally include that the audio reproduction feature includes at least one of a group of audio reproduction features of the predetermined terminal hearing device, the group including information of a unique ID, a name, a network address, and a classification.

In Example 23, the subject matter of any of Examples 19 to 22 may optionally include that the processor is configured to modify the signal representing the audio signal according to the PAF file and a machine learning algorithm.

Example 24 is a hearing aid system. The hearing aid system may include a communication device, including at least one microphone configured to convert sound received from an audio source into at least one signal representing the audio signal, one per microphone, at least one processor configured to receive the at least one signal representing the audio signal, a wireless communication terminal, and a storage element coupled to the processor having a personal audibility feature (PAF) file stored therein, the PAF file including a personal audibility feature of a predetermined user, wherein the processor is further configured to modify the at least one signal representing the audio signal according to the PAF file and to provide a further signal representing an audio stream based on the modified signal to the wireless communication terminal, wherein the provision of the further signal representing the audio stream is activatable by manual control or by an acoustic activation signal received in the at least one microphone, and at least one terminal hearing device configured to receive the further signal representing the audio stream from the wireless communication terminal.

In Example 25, the subject matter of Example 24 may optionally include that the at least one terminal hearing device includes at least one hearing device microphone, one per terminal hearing device.

In Example 26, the subject matter of Example 24 or 25 may optionally include that the at least one microphone of the communication device is configured to provide the further signal representing the audio stream corresponding to the audio source with a higher signal quality than a signal quality of a yet further signal representing an audio stream based on the sound of the audio source received by the at least one hearing device microphone.

In Example 27, the subject matter of Example 26 may optionally include that the difference in signal quality between the further signal representing the audio stream using the at least one microphone of the communication device and the yet further signal representing the audio stream using the at least one hearing device microphone originates in at least one of a group of configuration differences between the communication device and the at least one terminal hearing device, the group including that the at least one microphone of the communication device is closer to the audio source than the terminal hearing device, that the at least one microphone of the communication device includes a higher number of microphones than the terminal hearing device, that the at least one microphone of the communication device is of higher quality than the microphone of the terminal hearing device, for example with a lower self-noise, a lower impedance, and/or with a higher maximum acceptable sound pressure level (SPL), and that the at least one microphone of the communication device is a special-purpose microphone of a group of special-purpose microphones, and the microphone of the terminal hearing device is not, the group including a noise cancelling microphone, a directional microphone, a noise-cancelling microphone, and a hydrophone.

In Example 28, the subject matter of any of Examples 24 to 27 may optionally include that the at least one terminal hearing device includes at least one hearing device microphone configured to convert sound received from another audio source into another signal representing an audio signal, wherein the at least one terminal hearing device is configured to transmit, at least while the provision of the further signal representing the audio stream is de-activated, the another signal representing the audio signal to the wireless communication terminal, and that the processor is further configured to receive the another signal representing the audio signal and to modify the another signal representing the audio signal according to the PAF file and to provide another further signal representing an audio stream based on the modified signal representing the audio signal to the at least one terminal hearing device via the wireless communication terminal.

In Example 29, the subject matter of Example 28 may optionally include that the at least one terminal hearing device is configured to transmit the another signal representing the audio signal to the wireless communication terminal also while the provision of the further signal representing the audio stream is activated, that the at least one terminal hearing device includes at least one loudspeaker, and that the terminal hearing device is further configured to provide an overlaid audio signal of the further signal and the yet further signal to the loudspeaker.

In Example 29, the subject matter of any of Examples 24 to 28 may optionally further include a second terminal hearing device, wherein the storage element has a second personal audibility feature (PAF) file stored therein, the PAF file including a personal audibility feature of a second predetermined user, and wherein the processor is further configured to modify the at least one signal representing the audio signal according to the second PAF file and to provide a second further signal representing an audio stream based on the modified signal to the second terminal hearing device via the wireless communication terminal.

In Example 30, the subject matter of any of Examples 24 to 29 may optionally include that the at least one microphone includes at least two microphones arranged at spatially separated locations, wherein the processor is further configured to jointly analyze the at least two signals representing audio signals and to perform noise and/or target sound recognition according to location-dependent differences between the two signals, and wherein the processor is configured to modify the signals representing the audio signals based on the PAF file and the recognized target sound and/or noise.

In Example 31, the subject matter of any of Examples 24 to 30 may optionally include that the wireless communication terminals of the communication device and of the terminal hearing device are configured as short range interfaces.

In Example 32, the subject matter of any of Examples 24 to 31 may optionally include that the wireless communication terminals of the communication device and of the terminal hearing device are configured as Bluetooth interfaces, in particular a Bluetooth Low Energy interfaces.

In Example 33, the subject matter of any of Examples 24 to 33 may optionally include that the terminal hearing device includes at least one earphone.

In Example 34, the subject matter of any of Examples 1 to 33 may optionally include that the personal audibility feature may include at least one personal audibility preference profile.

In Example 35, the subject matter of any one of Examples 1 to 34 may optionally include that modifying the signal includes or consists of at least partially amplifying the signal.

In Example 36, the subject matter of any one of Examples 13 to 18 and 24 to 35 may optionally be configured to determine the personal audibility feature.

In Example 37, the subject matter of any of Examples 1 to 36 may optionally include that the communication device is a mobile communication device or a stationary communication device.

In Example 38, the subject matter of any of Examples 1 to 37 may optionally include that the communication device may be or include a terminal communication device such as a smartphone, a tablet computer, a wearable device (e.g., a smart watch), an ornament with an integrated processor and communication interface, a laptop, a notebook, a personal digital assistant (PDA), and the like, or a personal desktop computer, and the like.

In Example 39, the subject matter of any of Examples 1 to 38 may optionally include that the PAF file may be a single file may include the personal audibility feature of the user and the audio reproduction feature of the terminal hearing device.

In Example 40, the subject matter of any one of Examples 13 to 18 and 24 to 39 may optionally include that the terminal hearing device is an in-the-ear phone.

Example 41 is a non-transitory computer readable medium that may include instructions that, if executed by one or more processors of a communication device, cause the one or more processors to receive, via a wireless communication terminal of a communication device, a signal representing an audio signal, to retrieve, from a storage element of the communication device, a personal audibility feature (PAF) file including a personal auditability feature of a predetermined user, to modify the signal representing the audio signal according to the PAF file, and to provide a further signal representing an audio stream based on the modified signal to the wireless communication terminal.

Example 42 is a non-transitory computer readable medium that may include instructions that, if executed by one or more processors of a communication device, cause the one or more processors to convert sound received by at least one microphone from an audio source into at least one signal representing an audio signal, one per microphone, to retrieving, from a storage element of the communication device, a personal audibility feature (PAF) file including a personal auditability feature of a predetermined user, to modify the signal representing the audio signal according to the PAF file, and to provide a further signal representing an audio stream based on the modified signal, to activate, by manual control or by an acoustic activation signal received in the at least one microphone, a provision of the further signal representing the audio stream, and to provide the further signal representing the audio stream to a wireless communication terminal of the communication device.

Example 43 is a machine-readable storage including machine-readable instructions that, when executed, realize a communication device of any preceding Examples.

Example 44 is a communication means, including a wireless communication means for receiving a signal representing an audio signal, a storing means for storing a personal audibility feature (PAF) file, the PAF file including a personal auditability feature of a predetermined user, and a processing means for modifying the signal according to an information stored in the PAF file and for providing a further signal representing an audio stream to the wireless communication means.

Example 45 is a communication means, including a sound reception means for converting sound received from an audio source into at least one signal representing an audio signal, a storing means for storing a personal audibility feature (PAF) file, the PAF file including a personal auditability feature of a predetermined user, a processing means for modifying the signal according to an information stored in the PAF file and for providing a further signal representing an audio stream based on the modified signal, a wireless communication means for receiving the further signal, and an activation means for activating the provision of the further signal by manual control or by an acoustic activation signal received in the sound reception means. The word "exemplary" is used herein to mean "serving as an example, instance, or illustration." Any example or design described herein as "exemplary" is not necessarily to be construed as preferred or advantageous over other examples or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e., one or more. Any term expressed in plural form that does not expressly state "plurality" or "multiple" likewise refers to a quantity equal to or greater than one.

The terms "processor" or "controller" as, for example, used herein may be understood as any kind of technological entity that allows handling of data. The data may be handled according to one or more specific functions that the processor or controller execute. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "connected" can be understood in the sense of a (e.g., mechanical and/or electrical), e.g., direct or indirect, connection and/or interaction. For example, several elements can be connected together mechanically such that they are physically retained (e.g., a plug connected to a socket) and electrically such that they have an electrically conductive path (e.g., signal paths exist along a communicative chain).

While the above descriptions and connected figures may depict electronic device components as separate elements, skilled persons will appreciate the various possibilities to combine or integrate discrete elements into a single element. Such may include combining two or more components from a single component, mounting two or more components onto a common chassis to form an integrated component, executing discrete software components on a common processor core, etc. Conversely, skilled persons will recognize the possibility to separate a single element into two or more discrete elements, such as splitting a single component into two or more separate component, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A communication device, comprising:
a wireless communication terminal;
at least one processor configured to receive a signal representing an audio signal from the wireless communication terminal; and
a storage element coupled to the processor having a personal audibility feature (PAF) file stored therein, the PAF file comprising a personal audibility feature of a predetermined user;
wherein the processor is further configured to modify the signal representing the audio signal according to the PAF file and to provide a further signal representing an audio stream based on the modified signal to the wireless communication terminal; and wherein the processor comprises a classifier configured to analyze the audio signal, to classify a hearing condition based on the analysis of characteristics of the received audio signal, and to process the audio signal according to the classified hearing conditions.

2. The communication device of claim 1,
wherein the wireless communication terminal is further configured to transmit the further signal representing the audio stream to a terminal hearing device.

3. The communication device of claim 1,
wherein the wireless communication terminal is further configured to receive the signal representing the audio signal from a terminal hearing device.

4. The communication device of claim 1,
wherein the personal audibility feature comprises a personal audibility curve.

5. The communication device of claim 1,
wherein the processor is configured to modify the signal representing the audio signal according to the PAF file and a machine learning algorithm.

6. A hearing aid system, comprising a communication device and a terminal hearing device,
the communication device comprising:
a wireless communication terminal;
at least one processor configured to receive a signal representing an audio signal from the wireless communication terminal; and
a storage element coupled to the processor having a personal audibility feature (PAF) file stored therein, the PAF file comprising a personal audibility feature of a predetermined user;
wherein the processor is further configured to modify the signal representing the audio signal according to the PAF file and to provide a further signal representing an audio stream based on the modified signal to the terminal hearing device via the wireless communication terminal; and
wherein the processor comprises a classifier configured to analyze the audio signal, to classify a hearing condition based on the analysis of characteristics of the received audio signal, and to process the audio signal according to the classified hearing conditions.

7. The hearing aid system of claim 6,
wherein the terminal hearing device comprises a microphone configured to convert sound received from an audio source into the signal representing the audio signal.

8. The hearing aid system of claim 7,
wherein the terminal hearing device further comprises a wireless communication terminal configured to transmit the signal representing the audio signal to the wireless communication terminal of the communication device.

9. The hearing aid system of claim 6,
wherein the wireless communication terminal of the communication device and of the terminal hearing device are configured as short range interfaces.

10. The hearing aid system of claim 6,
wherein the wireless communication terminal of the communication device and of the terminal hearing device are configured as Bluetooth interfaces, in particular a Bluetooth Low Energy interfaces.

11. A communication device, comprising:
at least one microphone configured to convert sound received from an audio source into at least one signal representing an audio signal, one per microphone;

at least one processor configured to receive the at least one signal representing the audio signal;

a wireless communication terminal; and a storage element coupled to the processor having a personal audibility feature (PAF) file stored therein, the PAF file comprising a personal audibility feature of a predetermined user;

wherein the processor is further configured to modify the at least one signal representing the audio signal according to the PAF file and to provide a further signal representing an audio stream based on the modified signal to the wireless communication terminal, wherein the provision of the further signal representing the audio stream is activatable by manual control or by an acoustic activation signal received in the at least one microphone; and wherein the processor comprises a classifier configured to analyze the audio signal, to classify a hearing condition based on the analysis of characteristics of the received audio signal, and to process the audio signal according to the classified hearing conditions.

12. The communication device of claim 11, wherein the personal audibility feature comprises a personal audibility curve.

13. The communication device of claim 11, wherein the modification corresponds to the information stored in the PAF file, the PAF file further comprising an audio reproduction feature of a predetermined terminal hearing device.

14. The communication device of claim 13, wherein the audio reproduction feature comprises at least one of a group of audio reproduction features of the predetermined terminal hearing device, the group comprising:

information of a unique ID, a name, a network address, and a classification.

15. The communication device of claim 11, wherein the processor is configured to modify the signal representing the audio signal according to the PAF file and a machine learning algorithm.

16. A hearing aid system, comprising:

a communication device, comprising:

at least one microphone configured to convert sound received from an audio source into at least one signal representing an audio signal, one per microphone;

at least one processor configured to receive the at least one signal representing the audio signal;

a wireless communication terminal; and a storage element coupled to the processor having a personal audibility feature (PAF) file stored therein, the PAF file comprising a personal audibility feature of a predetermined user;

wherein the processor is further configured to modify the at least one signal representing the audio signal according to the PAF file and to provide a further signal representing an audio stream based on the modified signal to the wireless communication terminal, wherein the provision of the further signal representing the audio stream is activatable by manual control or by an acoustic activation signal received in the at least one microphone; and at least one terminal hearing device configured to receive the further signal representing the audio stream from the wireless communication terminal; and wherein the processor comprises a classifier configured to analyze the audio signal, to classify a hearing condition based on the analysis of characteristics of the received audio signal, and to process the audio signal according to the classified hearing conditions.

17. The hearing aid system of claim 16, wherein the at least one terminal hearing device comprises at least one hearing device microphone, one per terminal hearing device.

18. The hearing aid system of claim 16, wherein the at least one microphone of the communication device is configured to provide the further signal representing the audio stream corresponding to the audio source with a higher signal quality than a signal quality of a yet further signal representing an audio stream based on the sound of the audio source received by the at least one hearing device microphone.

19. The hearing aid system of claim 18, wherein the difference in signal quality between the further signal representing the audio stream using the at least one microphone of the communication device and the yet further signal representing the audio stream using the at least one hearing device microphone originates in at least one of a group of configuration differences between the communication device and the at least one terminal hearing device, the group comprising:

the at least one microphone of the communication device is closer to the audio source than the terminal hearing device;

the at least one microphone of the communication device comprises a higher number of microphones than the terminal hearing device;

the at least one microphone of the communication device is of higher quality than the microphone of the terminal hearing device, for example with a lower self-noise, a lower impedance, and/or with a higher maximum acceptable sound pressure level (SPL);

the at least one microphone of the communication device is a special-purpose microphone of a group of special-purpose microphones, and the microphone of the terminal hearing device is not, the group comprising:

a noise cancelling microphone, a directional microphone, a noise-cancelling microphone; and a hydrophone.

20. The hearing aid system of claim 16, wherein the at least one terminal hearing device comprises at least one hearing device microphone configured to convert sound received from another audio source into another signal representing the audio signal;

wherein the at least one terminal hearing device is configured to transmit, at least while the provision of the further signal representing the audio stream is deactivated, the another signal representing the audio signal to the wireless communication terminal;

wherein the processor is further configured to receive the another signal representing the audio signal and to modify the another signal according to the PAF file and to provide another further signal representing an audio stream based on the modified another signal to the at least one terminal hearing device via the wireless communication terminal.

21. The hearing aid system of claim 20, wherein the at least one terminal hearing device is configured to transmit the another signal to the wireless communication terminal also while the provision of the further signal representing the audio stream is activated;

wherein the at least one terminal hearing device comprises at least one loudspeaker; and wherein the terminal hearing device is further configured to provide an overlaid audio signal of the further signal and the another furthersignal to the loudspeaker.

22. The hearing aid system of claim 16, further comprising:

a second terminal hearing device;

wherein the storage element has a second personal audibility feature (PAF) file stored therein, the PAF file comprising a personal audibility feature of a second predetermined user;

wherein the processor is further configured to modify the at least one signal representing the audio signal according to the second PAF file and to provide a second signal representing the audio stream based on the modified signal to the second terminal hearing device via the wireless communication terminal.

23. The hearing aid system of claim 16, wherein the at least one microphone comprises at least two microphones arranged at spatially separated locations;

wherein the processor is further configured to jointly analyze the at least two signals representing the audio signals and to perform noise and/or target sound recognition according to location-dependent differences between the audio signals;

wherein the processor is configured to modify the audio signals based on the PAF file and the recognized target sound and/or noise.

24. The hearing aid system of claim 16, wherein the wireless communication terminals of the communication device and of the terminal hearing device are configured as short range interfaces.

* * * * *